United States Patent
Nakajima (10) Patent No.: US 7,953,938 B2
(45) Date of Patent: May 31, 2011

(54) PROCESSOR ENABLING INPUT/OUTPUT OF DATA DURING EXECUTION OF OPERATION

(75) Inventor: Masami Nakajima, Tokyo (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 429 days.

(21) Appl. No.: 11/907,049

(22) Filed: Oct. 9, 2007

(65) Prior Publication Data

US 2008/0091904 A1    Apr. 17, 2008

(30) Foreign Application Priority Data

Oct. 17, 2006  (JP) .................................. 2006-282559

(51) Int. Cl.
*G06F 13/00* (2006.01)
(52) U.S. Cl. ...................... 711/154; 711/167; 711/168
(58) Field of Classification Search .................. 711/154, 711/167, 168
See application file for complete search history.

(56) References Cited

U.S. PATENT DOCUMENTS

| 5,875,470 | A  | * | 2/1999 | Dreibelbis et al. | ............. 711/147 |
| 2004/0059879 | A1 | * | 3/2004 | Rogers | ........................ 711/154 |

FOREIGN PATENT DOCUMENTS

| JP | 2001-76125 A | 3/2001 |
| JP | 2003-203225 A | 7/2003 |

* cited by examiner

*Primary Examiner* — Tuan V Thai
*Assistant Examiner* — Jae U Yu
(74) *Attorney, Agent, or Firm* — Buchanan Ingersoll & Rooney PC (57) ABSTRACT

When free bank information representing that a bank is not used by a PE and outputted from a PE controller coincides with used bank information representing that a bank is used for data transfer and outputted from a bus controller, a memory controller controls LM-banks 0 to 3 and a switching network so as to enable all communications. Therefore, data reading and data writing by the PE is performed in parallel with the data transfer with the outside, so that processing time of the PE can be reduced.

2 Claims, 7 Drawing Sheets

REQUEST BANK NUMBER

EXECUTION BANK NUMBER

|  |  | T0 | T1 | T2 | T3 |
|---|---|---|---|---|---|
| PE | Read 0 | 0 / 0 | 1 / 1 | 2 / 2 | 3 / 3 |
| PE | Read 1 | 3 / 3 | 0 / 0 | 1 / 1 | 2 / 2 |
| PE | Write | 2 / 2 | 3 / 3 | 0 / 0 | 1 / 1 |
| BUFFER |  | 1 / 1 | 2 / 2 | 3 / 3 | 0 / 0 |

FIG.6

|  |  | T0 | T1 | T2 | T3 |
|---|---|---|---|---|---|
| PE | Read 0 | 0 / X | 0 / 0 | 1 / 1 | 2 / 2 |
| PE | Read 1 | 3 / X | 3 / 3 | 0 / 0 | 1 / 1 |
| PE | Write | 2 / X | 2 / 2 | 3 / 3 | 0 / 0 |
| BUFFER |  | 0 / 0 | 1 / 1 | 2 / 2 | 3 / 3 |

FIG.7

|    |         | T0 | T1 | T2 | T3 |
|----|---------|----|----|----|----|
| PE | Read 0  | 0  | 1  | 2  | 3  |
|    |         | 0  | 1  | 2  | 3  |
|    | Read 1  | 3  | 0  | 1  | 2  |
|    |         | 3  | 0  | 1  | 2  |
|    | Write   | 2  | 3  | 0  | 1  |
|    |         | 2  | 3  | 0  | 1  |
| BUFFER |     | 2  | 2  | 3  | 0  |
|    |         | X  | 2  | 3  | 0  |

FIG.8

|    |         | T0 | T1 | T2 | T3 |
|----|---------|----|----|----|----|
| PE | Read 0  | 0  | 1  | 2  | 2  |
|    |         | 0  | 1  | X  | 2  |
|    | Read 1  | 3  | 0  | 1  | 1  |
|    |         | 3  | 0  | X  | 1  |
|    | Write   | 2  | 3  | 0  | 0  |
|    |         | 2  | 3  | X  | 0  |
| BUFFER |     | 0  | 0  | 0  | 1  |
|    |         | X  | X  | 0  | X  |
| CYCLE NUMBER UNDER WAIT | | 0→1 | 1→2 | 2→0 | 0→1 |

FIG.10

| | | T0 | T1 | T2 | T3 |
|---|---|---|---|---|---|
| PE | Read 0 | 0<br>0 | 1<br>1 | 2<br>2 | 3<br>3 |
| | Read 1 | 3<br>3 | 0<br>0 | 1<br>1 | 2<br>2 |
| | Write | 2<br>2 | 3<br>3 | 0<br>0 | 1<br>1 |
| BUFFER | | X<br>1 | X<br>2 | X<br>3 | X<br>0 |

FIG.11

| | | T0 | T1 | T2 | T3 |
|---|---|---|---|---|---|
| PE | Read 0 | 0<br>0 | 1<br>1 | 2<br>2 | 3<br>3 |
| | Read 1 | X<br>X | X<br>X | X<br>X | X<br>X |
| | Write | 3<br>3 | 0<br>0 | 1<br>1 | 2<br>2 |
| BUFFER | | X<br>1,2 | X<br>2,3 | X<br>0,3 | X<br>0,1 |

PROCESSOR ENABLING INPUT/OUTPUT OF DATA DURING EXECUTION OF OPERATION

BACKGROUND OF THE INVENTION

1. Field of the Invention

The present invention relates to a processor that divides data to be operated into a plurality of parts and sequentially executes operations for the plurality of parts, and in particular, to a processor capable of inputting/outputting data during execution of operations.

2. Description of the Background Art

In recent years, digital signal processing in which a large amount of data such as audio data or image data are processed at high speeds has become increasingly important with the spread of portable terminal equipment. Generally, for such digital signal processing, a DSP (Digital Signal Processor) is often used as a dedicated semiconductor device. However, when the amount of data to be processed is very large, it is difficult to dramatically increase the performance even with the use of such a dedicated DSP. For example, when the data to be operated consists of 10,000 sets of data, at least 10,000 cycles are required for the operation even when operation for each data set is executable in one machine cycle. In other words, although processing for each data set is executed at a high speed, the processing time extends as the amount of data increases because data processing is executed serially.

When the amount of data to be processed is large, processing performance may be improved by carrying out parallel operation. That is, it is possible to simultaneously execute a plurality of data processes by preparing a plurality of operating units and making them simultaneously operate. In such a situation, for carrying out the same operation for the plurality of sets of data, it is possible to reduce the areas of the operating units while keeping high parallelism by employing a method called SIMD (Single Instruction stream-Multiple Data stream). In other words, when a plurality of data processors are provided, high performance can be achieved with a small area by sharing a controller that interprets instructions and controls the processing.

When the amount of data to be processed is large, performance per area is improved when addition, which is a basic arithmetic operation, is performed bit-serially. For example, thirty-two 1-bit adders (hereinafter, referred to as A) and one 32-bit adder (hereinafter, referred to as B) are considered. These A and B are the same in cycle number of 32 in the sense that 32 additions are performed. However, they are different in length of serial operation executed in one cycle. For example, when B is realized by a series of thirty-two 1-bit adders, the operation time of B is 32-times longer than A although the areas of A and B are the same. On the other hand, when B is realized by a high-speed operating unit such as a carry look-ahead, the operation time of B is shorter than A; however, the area of B is larger than A. Therefore, performance per area of A is better than B.

In the case of a multiplier, when a 2-bit process is executed using a secondary Booth's algorithm, it is possible to reduce the number of additions of partial product to half of the case of 1-bit process.

In this manner, when numerous additions and multiplications are performed, it is possible to improve performance per area by the SIMD method based on a serial operation of 1-bit or 2-bit. Further, this method may be used in various applications because data width of data to be processed is not fixed. As a technique related to the above, inventions disclosed in Japanese Patent Laying-Open Nos. 2003-203225 (hereinafter, referred to as Document 1) and 2001-076125 (hereinafter, referred to as Document 2) can be exemplified.

In a data converting device disclosed in Document 1, a data processor is capable of simultaneously processing a predetermined number of pieces of data in a parallel manner. A buffer memory is capable of storing data which is sequentially inputted, and of simultaneously inputting/outputting a predetermined number of pieces of data in units of bit width suited for the process from/to the data processor in a parallel manner. A control information memory stores buffer memory control information data containing information specifying an LUT (Look Up Table) which is a different function from the data buffer function, and used region information. A buffer controller adaptively determines a data transfer line between the buffer memory and the data processor by assigning a data buffer function region and an LUT function region to the buffer memory based on the control information data, so that each function region is in a form suited for parallel input/output to/from the data processor.

In an image processing device disclosed in Document 2, a transfer controller is provided in an image processing processor. In the transfer controller, additional, updating image processing procedure and data for image processing are transferred by a process controller during an idle cycle time in which image processing is not executed by a processor array part, and temporarily stored in a host buffer. Then from the host buffer, the additional, updating image processing procedure and the data for image processing to a program RAM or a data RAM are transferred.

A processor according to the SIMD method executes an operation on operation data stored in a data memory. Therefore, it is necessary to input data to be used in the operation into the data memory from the outside before the operation, and to output data of an operation result to the outside from the data memory after the operation. Therefore, the processor is not able to carry out operation during the input/output of data to/from the data memory. Accordingly, there is a problem that the total processing time is extended.

Since the data converting device disclosed in Document 1 accumulates data in a buffer that is not used for operation, and transfers the data to a buffer for use in operation in a parallel manner as necessary, it is impossible to reduce the processing time of the processor.

Further, since the image processing device disclosed in Document 2 inputs/outputs data during an idle cycle of processing, it is impossible to reduce the processing time when the number of idle cycles is small.

SUMMARY OF THE INVENTION

It is an object of the present invention to provide a processor capable of carrying out an operation and a data transfer simultaneously.

According to one aspect of the present invention, there is provided a processor including an operation unit, a plurality of banks, a switching unit, and a controller. The controller controls the banks and the switching unit so as to allow any communication when free bank information representing that a bank is not used by the operation unit, and used bank information representing that a bank is used for a data transfer coincide with each other.

Therefore, a data reading and a data writing by the operation unit and the data transfer with the outside are carried out in parallel, so that it is possible to reduce the processing time of the operation unit.

The foregoing and other objects, features, aspects and advantages of the present invention will become more appar-

DESCRIPTION OF THE PREFERRED EMBODIMENTS

Figure 1:
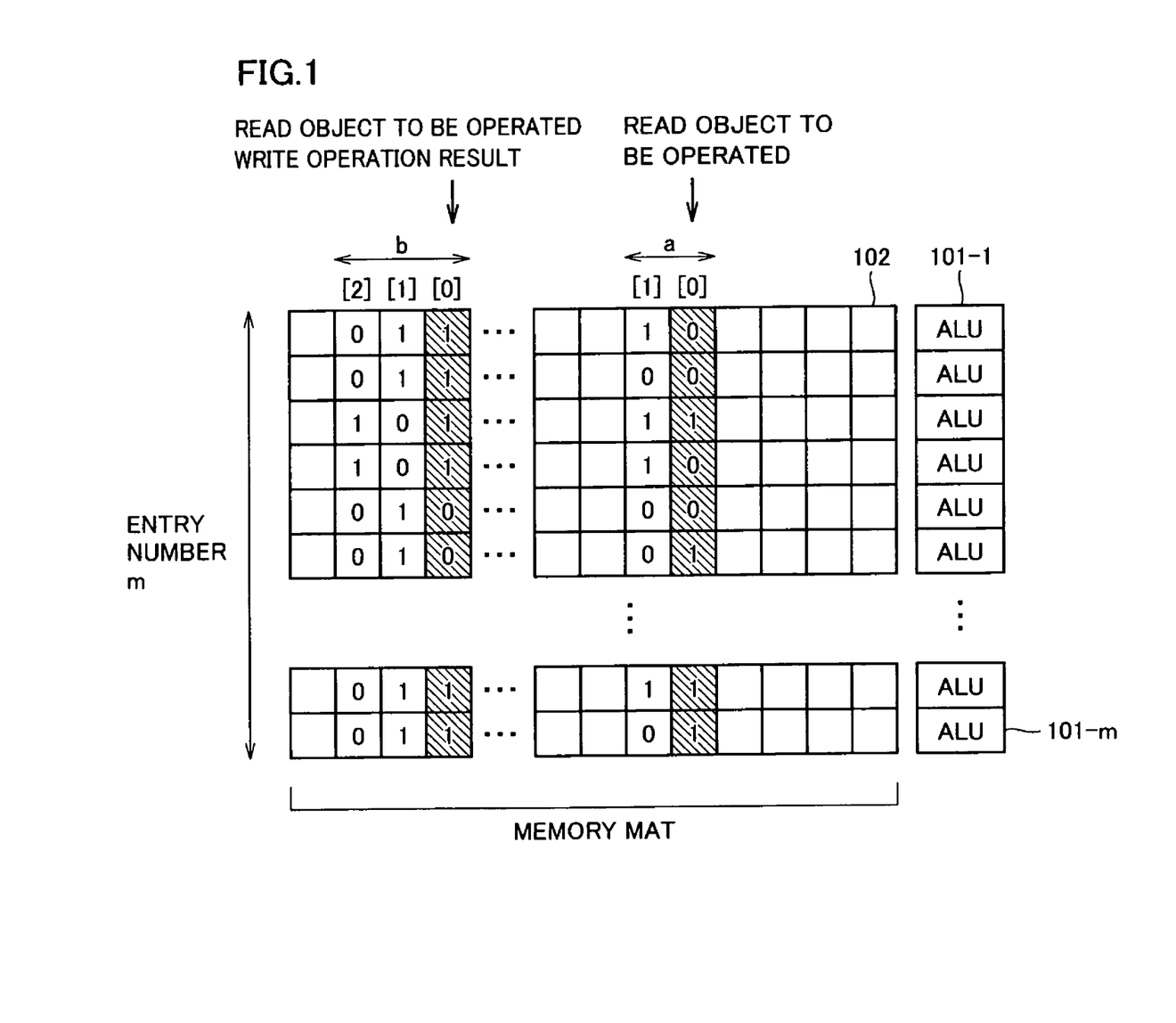
FIG. 1 is a diagram for explaining a bit serial operation.

FIG. 1 is a diagram for explaining a bit serial operation. Bit serial operation is executed sequentially from the low-order bits. First, a lower bit a[0] in data a stored in a memory mat 102 is transferred to ALUs (Arithmetic Logic Unit) 101-1 to 101-$m$. Then, also a lower bit b[0] of data b is transferred to ALUs 101-1 to 101-$m$. ALUs 101-1 to 101-$m$ execute addition operation using these two input data. The operation result is written into b[0]. This processing is executed also for a[1] and b[1]. In an addition operation, there is a possibility that a carry occurs, and thus the carry value is written into b[2]. In this manner, addition of data a and data b completes for every entry, and the operation result is obtained as b.

Figure 2:
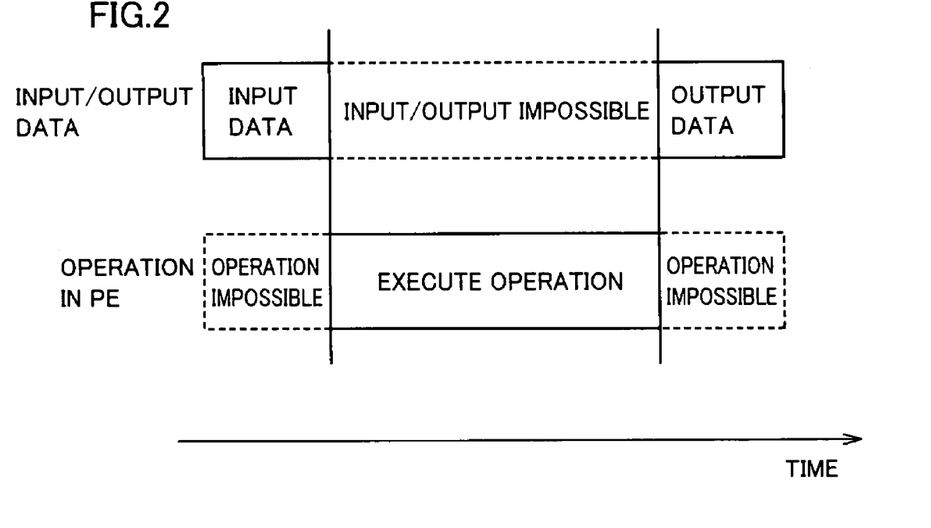
FIG. 2 is a diagram for explaining problems occurring when execution of an operation by a PE and input/output of data cannot be conducted simultaneously.

FIG. 2 is a diagram for explaining problems when execution of an operation by a PE and input/output of data cannot be performed simultaneously. As shown in FIG. 2, there is a problem that total processing time is extended because the operation by a PE is stopped while data input/output is carried out.

Figure 3:
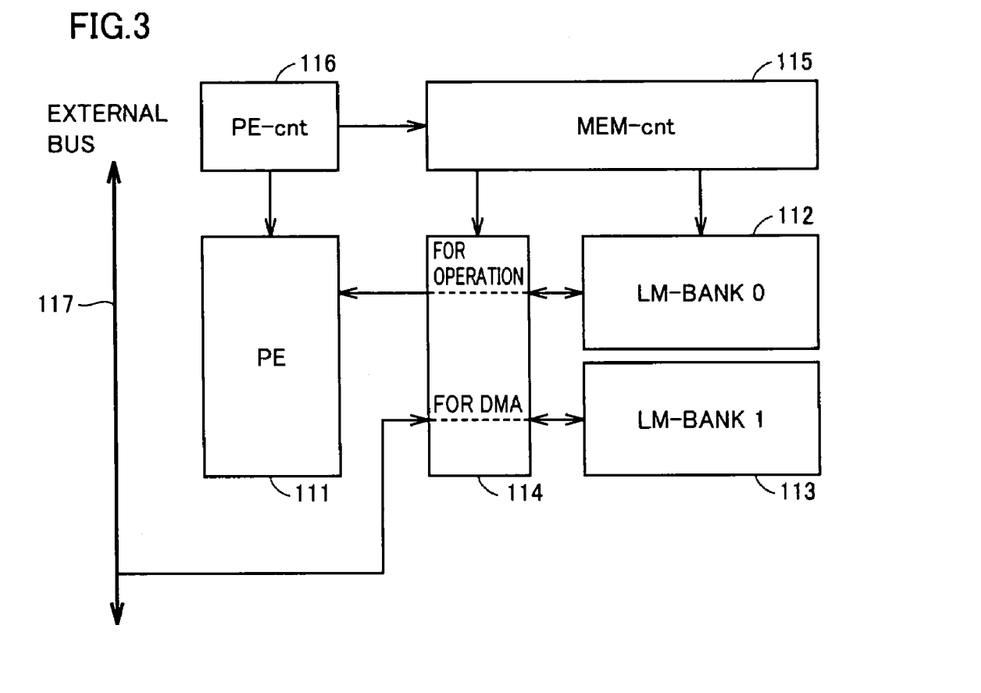
FIG. 3 is a diagram showing an exemplary configuration of a processor in which a memory is separated into two banks for operation and for DMA transfer.

FIG. 3 is a diagram showing an exemplary configuration of a processor in which a memory is separated into two banks for operation and for DMA (Direct Memory Access) transfer. The processor includes a PE 111, a local memory of bank 0 (hereinafter, referred to as LM-bank 0) 112, a local memory of bank 1 (hereinafter, referred to as LM-bank 1) 113, a switching network 114, a memory controller (MEM-cnt) 115, and a PE controller (PE-cnt) 116.

Into LM-bank 0 (112), data for operation is written by DMA transfer via an external bus 117 and switching network 114. The data written into LM-bank 0 (112) is read out as data for operation by PE 111. An operation result by PE 111 is sequentially written into LM-bank 0 (112). Then, the operation result written into LM-bank 0 (112) is transferred to the outside by DMA transfer via switching network 114 and external bus 117.

Likewise the above, into LM-bank 1 (113), data for operation is written by DMA transfer via external bus 117 and switching network 114. The data written into LM-bank 1 (113) is read out by PE 111 as data for operation. An operation result by PE 111 is sequentially written into LM-bank 1 (113). The operation result written into LM-bank 1 (113) is then transferred to the outside by DMA transfer via switching network 114 and external bus 117.

Switching network 114 switches data transfer paths, and assigns either one of LM-bank 0 (112) and LM-bank 1 (113) to a memory for operation for PE 111, and the other to a memory for data input/output (for DMA transfer).

Memory controller 115 switches switching network 114 and executes read/write control of LM-bank 0 (112) and LM-bank 1 (113) in response to an instruction from PE controller 116.

PE controller 116 carries out a control of an operation by PE 111 and instruction to memory controller 115 based on a decoded result of a fetched instruction.

In the processor shown in FIG. 3, since one of the two banks is assigned to a memory for operation, and the other to a memory for DMA transfer by switching the data transfer paths, the data memory that is not used for operation occupies half of the entire data memory, leading to a problem that an operation capability per area lowers.

First Embodiment

Figure 4:
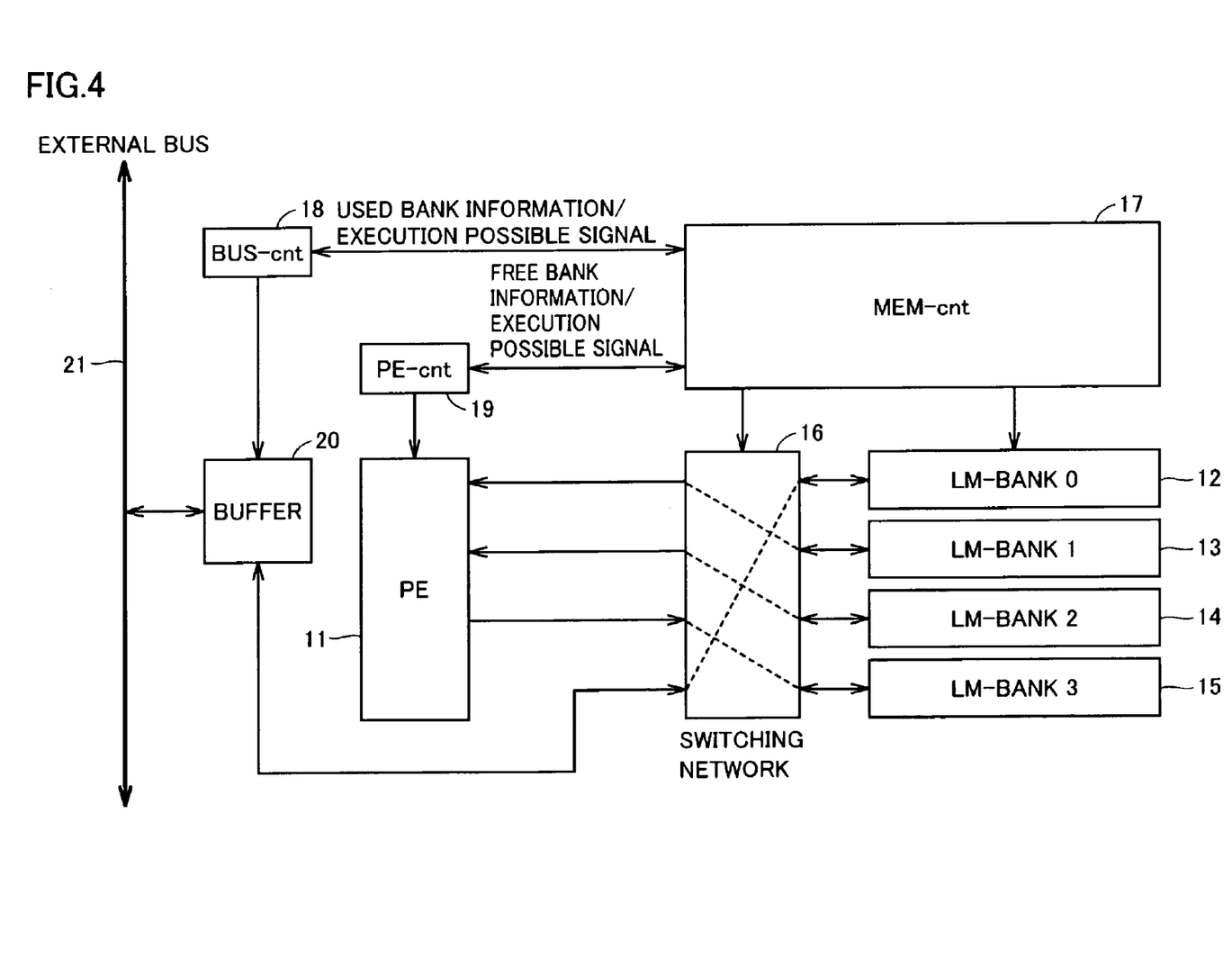
FIG. 4 is a block diagram showing an exemplary configuration of a processor in a first embodiment according to the present invention.

FIG. 4 is a block diagram showing an exemplary configuration of a processor in a first embodiment according to the present invention. This processor includes a PE 11, local memory of banks 0 to 3 (hereinafter, referred to as LM-banks 0 to 3) 12 to 15, a switching network 16, a memory controller (MEM-cnt) 17, a bus controller (BUS-cnt) 18, a PE controller (PE-cnt) 19, and a buffer 20.

PE 11 executes operations serially every one bit or two bits. PE 11 is connected with local memory by three ports via switching network 16, and uses any two of LM-banks 0 to 3 (12 to 15) as a memory for reading operation data, and uses either one of the remaining banks as a memory for writing operation results.

Data for operation is transferred to any one of LM-banks 0 to 3 (12 to 15) from buffer 20 via switching network 16. Data stored in any two of LM-banks 0 to 3 (12 to 15) is read out by PE 11 as data for operation. An operation result by PE 11 is sequentially written in any one of LM-banks 0 to 3 (12 to 15). Then, the operation result stored in any one of LM-banks 0 to 3 (12 to 15) is transferred to buffer 20 via switching network 16.

When PE 11 executes the operation, any two of LM-banks 0 to 3 (12 to 15) are used as memories for data reading, and either one of the remaining banks is used as memory for writing operation result, and the remaining one is used as a memory for data transfer with buffer 20. Memory controller 17 is capable of designating different addresses for the respective banks.

Switching network 16 switches data transfer paths, and assigns any two of LM-banks 0 to 3 (12 to 15) as memories for data reading, and either one of the remaining banks as a memory for writing operation results, and the remaining one as a memory for data transfer with buffer 20.

Memory controller 17 receives information from bus controller 18 and PE controller 19, and carries out switching of switching network 16 and a read/write control of LM-banks 0 to 3 (12 to 15).

Bus controller 18 controls the bus while outputting information representing a bank to be used as used bank information to memory controller 17 in response to a bank use request from buffer 20.

Based on a decoded result of a fetched instruction, PE controller 19 controls an operation by PE 11 while issuing an instruction to memory controller 17. PE controller 19 outputs information about a bank that is not used by PE 11 to memory controller 17 as free bank information.

Buffer 20 temporarily stores data when it transfers data with the outside via an external bus 21. Also buffer 20 has a function of orthogonal transformation. Since PE 11 executes operations every one bit or two bits, also LM-banks 0 to 3 (12 to 15) should store data in units of one bit or two bits. For this reason, buffer 20 orthogonally transforms a plurality of pieces of data transferred from the outside in a word unit to convert the plurality of pieces of data into data of 1-bit or 2-bit unit, and transfers them to LM-banks 0 to 3 (12 to 15).

Figure 5:
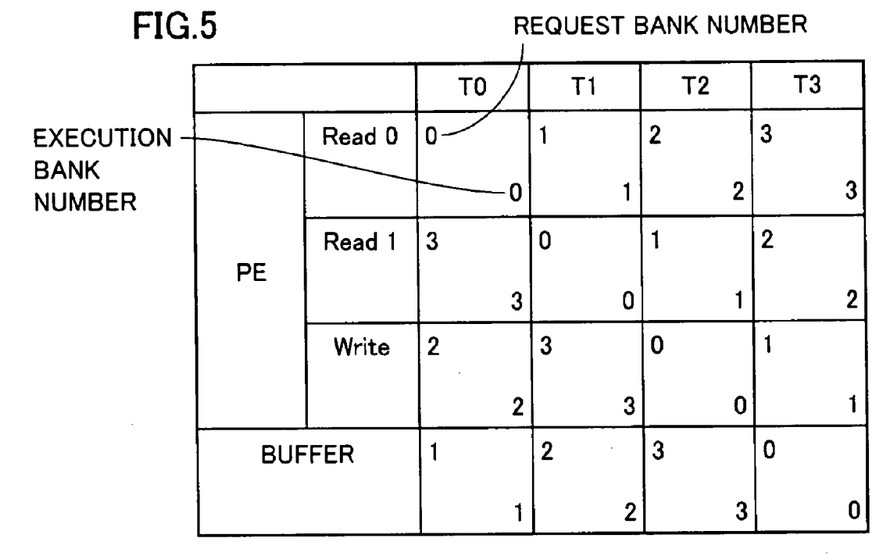
FIG. 5 is a timing chart for explaining one example of processing of the processor in the first embodiment according to the present invention.

FIG. 5 is a timing chart for explaining one example of processing of the processor in the first embodiment according to the present invention. In FIG. 5, request bank numbers are shown in the upper left parts, and execution bank numbers are shown in the lower right parts.

At a timing T0, PE 11 requests to use bank 0 and bank 3 as memories for reading, and bank 2 as a memory for writing. At this time, PE controller 19 outputs "bank 1" as free bank information to memory controller 17.

Also at timing T0, buffer 20 requests to use bank 1 as a memory for data transfer. At this time, bus controller 18 outputs "bank 1" as used bank information to memory controller 17.

Since the free bank information received from PE controller 19 coincides with the used bank information received from bus controller 18, memory controller 17 determines that all the requests are executable, and outputs execution possible signals to PE controller 19 and bus controller 18. Then, memory controller 17 controls LM-banks 0 to 3 (12 to 15) and switching network 16 so as to enable all communications.

Likewise, at timings T1 to T3, since the free bank information received from PE controller 19 coincides with the used bank information received from bus controller 18, memory controller 17 determines that all the requests are executable. Then it controls LM-banks 0 to 3 (12 to 15) and switching network 16 so as to enable all communications.

Figure 6:
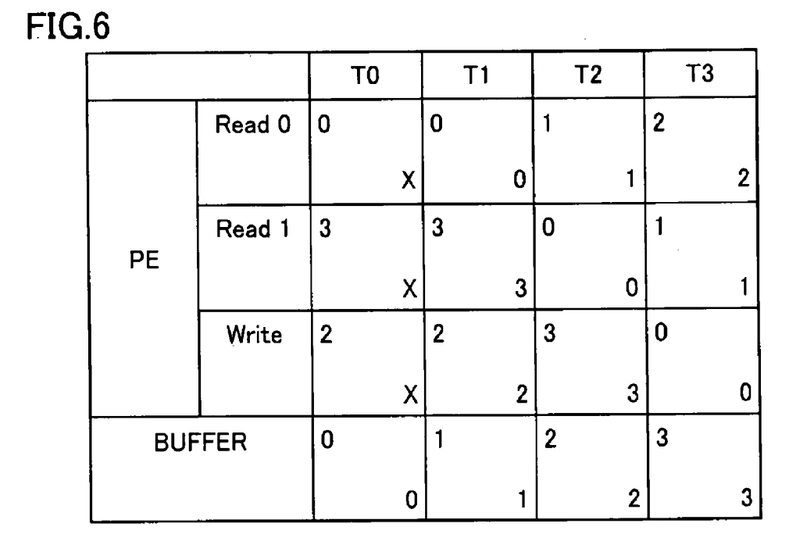
FIG. 6 is a timing chart for explaining another example of the processing of the processor in the first embodiment according to the present invention.

FIG. 6 is a timing chart for explaining another example of processing of the processor in the first embodiment according to the present invention.

At a timing T0, PE 11 requests to use bank 0 and bank 3 as memories for reading, and bank 2 as a memory for writing. At this time, PE controller 19 outputs "bank 1" as free bank information to memory controller 17.

At timing T0, buffer 20 requests to use bank 0 as a memory for data transfer. At this time, bus controller 18 outputs "bank 0" as used bank information to memory controller 17.

Since the free bank information received from PE controller 19 does not coincide with the used bank information received from bus controller 18, memory controller 17 determines that not all requests are executable. At this time, memory controller 17 outputs an execution possible signal to bus controller 18 while giving priority to the request of buffer 20, and outputs an execution impossible signal to PE controller 19. Then, memory controller 17 controls LM-banks 0 to 3 (12 to 15) and switching network 16 so that only the communication with buffer 20 is enabled.

At a timing T1, PE 11 requests to use bank 0 and bank 3 as memories for reading, and bank 2 as a memory for writing. At this time, PE controller 19 outputs "bank 1" as free bank information to memory controller 17.

At timing T1, buffer 20 requests to use bank 1 as a memory for data transfer. At this time, bus controller 18 outputs "bank 1" as used bank information to memory controller 17.

Since the free bank information received from PE controller 19 coincides with the used bank information received from bus controller 18, memory controller 17 determines that all the requests are executable, and outputs execution possible signals to PE controller 19 and bus controller 18. Then, memory controller 17 controls LM-banks 0 to 3 (12 to 15) and switching network 16 so as to enable all communications.

Likewise, at timings T2 to T3, since the free bank information received from PE controller 19 coincides with the used bank information received from bus controller 18, memory controller 17 determines that all the requests are executable. Then, it controls LM-banks 0 to 3 (12 to 15) and switching network 16 so as to enable all communications.

In this manner, both the request bank number from PE 11 and the request bank number from buffer 20 are rotated. Accordingly, once competition for banks is resolved, there occurs no competition for banks thereafter, so that all requests are executable.

As described above, according to the processor of the present embodiment, since it is configured that LM-banks 0 to 3 (12 to 15) and switching network 16 are controlled to enable all communication when the free bank information representing a bank number which is not used by PE 11 coincides with the used bank information representing a bank number which is used by buffer 20, it becomes possible to execute a data transfer with buffer 20 without stopping the operation of PE 11. Therefore, it becomes possible to reduce the processing time of the processor.

The configuration in which priority is given to the request of buffer 20 in the case where the requests of PE 11 and buffer 20 compete with each other achieves the data transfer at a high-speed.

Second Embodiment

The exemplary configuration of a processor in a second embodiment according to the present invention is similar to the exemplary configuration of the processor in the first embodiment shown in FIG. 4. Also in the second embodiment, the processing in the case where all requests are executable is the same as the processing described in the first embodiment shown in FIG. 5. Accordingly, detailed description of the overlapping configurations and functions will not be repeated.

Figure 7:
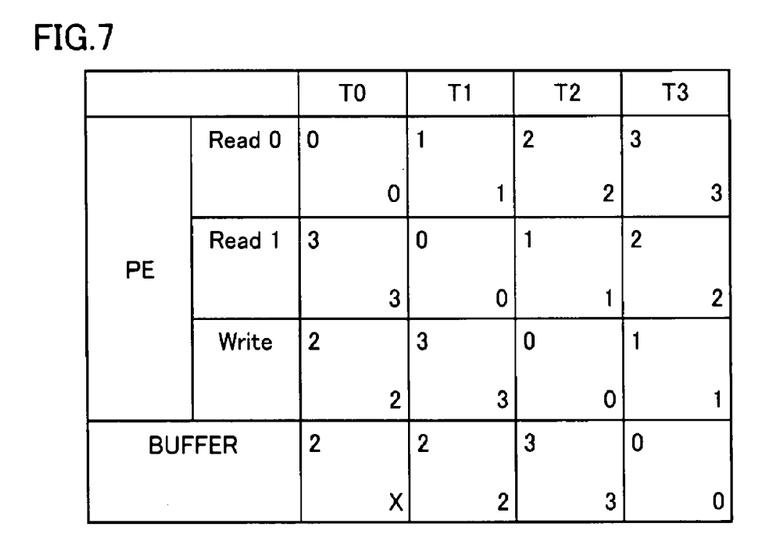
FIG. 7 is a timing chart for explaining one example of processing of a processor in a second embodiment according to the present invention.

FIG. 7 is a timing chart for explaining one example of processing of the processor in the second embodiment according to the present invention.

At a timing T0, PE 11 requests to use bank 0 and bank 3 as memories for reading, and bank 2 as a memory for writing. At this time, PE controller 19 outputs "bank 1" as free bank information to memory controller 17.

Further, at timing T0, buffer 20 requests to use bank 2 as a memory for data transfer. At this time, bus controller 18 outputs "bank 2" as used bank information to memory controller 17.

Since the free bank information received from PE controller 19 does not coincide with the used bank information received from bus controller 18, memory controller 17 determines that not all requests are executable. At this time, memory controller 17 outputs an execution possible signal to PE controller 19 while giving priority to the request of PE 11, and outputs an execution impossible signal to bus controller 18. Then, memory controller 17 controls LM-banks 0 to 3 (12 to 15) and switching network 16 so that only the communication with PE 11 is enabled.

At a timing T1, PE 11 requests to use bank 1 and bank 0 as memories for reading, and bank 3 as a memory for writing. At this time, PE controller 19 outputs "bank 2" as free bank information to memory controller 17.

At timing T1, buffer 20 requests to use bank 2 as a memory for data transfer. At this time, bus controller 18 outputs "bank 2" as used bank information to memory controller 17.

Since the free bank information received from PE controller 19 coincides with the used bank information received from bus controller 18, memory controller 17 determines that all the requests are executable, and outputs execution possible signals to PE controller 19 and bus controller 18. Then, memory controller 17 controls LM-banks 0 to 3 (12 to 15) and switching network 16 so as to enable all communications.

Likewise, at timings T2 to T3, since the free bank information received from PE controller 19 coincides with the used bank information received from bus controller 18, memory controller 17 determines that all the requests are executable. And it controls LM-banks 0 to 3 (12 to 15) and switching network 16 so as to enable all communications.

In this manner, both the request bank number from PE 11 and the request bank number from buffer 20 are rotated. Accordingly, once competition for banks is resolved, there occurs no competition for banks thereafter, so that all requests are executable.

As described above, according to the processor in the present embodiment, since priority is given to the request of PE 11 when the requests of PE 11 and buffer 20 compete with each other, it is possible to achieve a high-speed operation in PE 11 as well as the effect realized when there is no competition for banks as described in the first embodiment.

Third Embodiment

The exemplary configuration of a processor in a third embodiment according to the present invention is similar to the exemplary configuration of the processor in the first embodiment shown in FIG. 4. Also in the third embodiment, the processing in the case where all requests are executable is the same as the processing described in the first embodiment shown in FIG. 5. Accordingly, detailed description of the overlapping configurations and functions will not be repeated.

Figure 8:
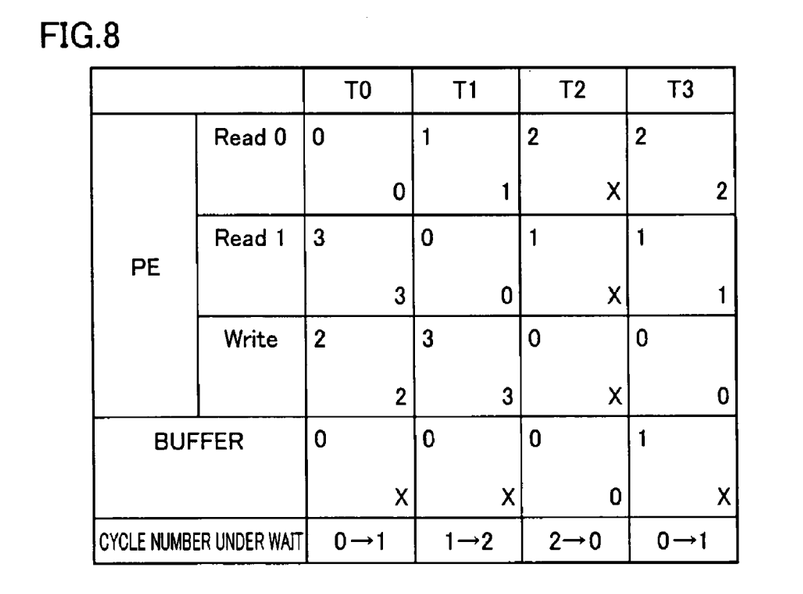
FIG. 8 is a timing chart for explaining one example of processing of a processor in a third embodiment according to the present invention.

FIG. 8 is a timing chart for explaining one example of processing of the processor in the third embodiment according to the present invention.

At a timing T0, PE 11 requests to use bank 0 and bank 3 as memories for reading, and bank 2 as a memory for writing. At this time, PE controller 19 outputs "bank 1" as free bank information to memory controller 17.

Also at timing T0, buffer 20 requests to use bank 0 as a memory for data transfer. At this time, bus controller 18 outputs "bank 0" as used bank information to memory controller 17.

Since the free bank information received from PE controller 19 does not coincide with the used bank information received from bus controller 18, memory controller 17 determines that not all requests are executable. At this time, memory controller 17 outputs an execution possible signal to PE controller 19 while giving priority to the request of PE 11 because the requests of PE 11 and buffer 20 compete with each other and the cycle number in which buffer 20 waits is "0", and outputs an execution impossible signal to bus controller 18.

Memory controller 17 controls LM-banks 0 to 3 (12 to 15) and switching network 16 so as to enable the communication only with PE 11. Here, memory controller 17 updates the cycle number in which buffer 20 waits to "1" from "0".

At a timing T1, PE 11 request to use bank 1 and bank 0 as memories for reading, and bank 3 as a memory for writing. At this time, PE controller 19 outputs "bank 2" as free bank information to memory controller 17.

Also at timing T1, buffer 20 requests to use bank 0 as a memory for data transfer. At this time, bus controller 18 outputs "bank 0" as used bank information to memory controller 17.

Since the free bank information received from PE controller 19 does not coincide with the used bank information received from bus controller 18, memory controller 17 determines that not all requests are executable. At this time, memory controller 17 outputs an execution possible signal to PE controller 19 while giving priority to the request of PE 11 because the requests of PE 11 and buffer 20 compete with each other and the cycle number in which buffer 20 waits is "1", and outputs an execution impossible signal to bus controller 18.

Memory controller 17 controls LM-banks 0 to 3 (12 to 15) and switching network 16 so as to enable the communication only with PE 11. Here, memory controller 17 updates the cycle number in which buffer 20 waits to "2" from "1".

At a timing T2, PE 11 requests to use bank 2 and bank 1 as memories for reading, and bank 0 as a memory for writing. At this time, PE controller 19 outputs "bank 3" as free bank information to memory controller 17.

Also in timing T2, buffer 20 requests to use bank 0 as a memory for data transfer. At this time, bus controller 18 outputs "bank 0" as used bank information to memory controller 17.

Since the free bank information received from PE controller 19 does not coincide with the used bank information received from bus controller 18, memory controller 17 determines that not all requests are executable. At this time, memory controller 17 outputs an execution possible signal to bus controller 18 while giving priority to the request of buffer 20 because the requests of PE 11 and buffer 20 compete with each other and the cycle number in which buffer 20 waits is "2", and outputs an execution impossible signal to PE controller 19.

Memory controller 17 controls LM-banks 0 to 3 (12 to 15) and switching network 16 so as to enable the communication only with buffer 20. Here, memory controller 17 updates the cycle number in which buffer 20 waits to "0" from "2".

At a timing T3, PE 11 requests to use bank 2 and bank 1 as memories for reading, and bank 0 as a memory for writing. At this time, PE controller 19 outputs "bank 3" as free bank information to memory controller 17.

Also at timing T3, buffer 20 requests to use bank 1 as a memory for data transfer. At this time, bus controller 18 outputs "bank 1" as used bank information to memory controller 17.

Since the free bank information received from PE controller 19 does not coincide with the used bank information received from bus controller 18, memory controller 17 determines that not all requests are executable. At this time, memory controller 17 outputs an execution possible signal to PE controller 19 while giving priority to the request of PE 11 because the requests of PE 11 and buffer 20 compete with each other and the cycle number in which buffer 20 waits is "0", and outputs an execution impossible signal to bus controller 18.

Memory controller 17 controls LM-banks 0 to 3 (12 to 15) and switching network 16 so as to enable the communication only with PE 11. Here, memory controller 17 updates the cycle number in which buffer 20 waits to "1" from "0".

Although in the above description, priority is given to the request of buffer 20 when the requests of PE 11 and buffer 20 compete with each other, and the number of cycles in which buffer 20 waits is "2", the number of cycles at which priority is given to the request of buffer 20 may be another value. Also, priority may be given to the request of PE 11 only when the number of cycles in which PE 11 waits is a predetermined value by counting the number of cycles in which PE 11 waits.

As described above, according to the processor in the present embodiment, since priority is given to the request of buffer 20 only when the requests of PE 11 and buffer 20 compete with each other, and the number of cycles in which buffer 20 waits is a predetermined value, it is possible to ensure latency of data transfer with buffer 20 in addition to the effect described in the first embodiment where there is no competition for banks.

Fourth Embodiment

Figure 9:
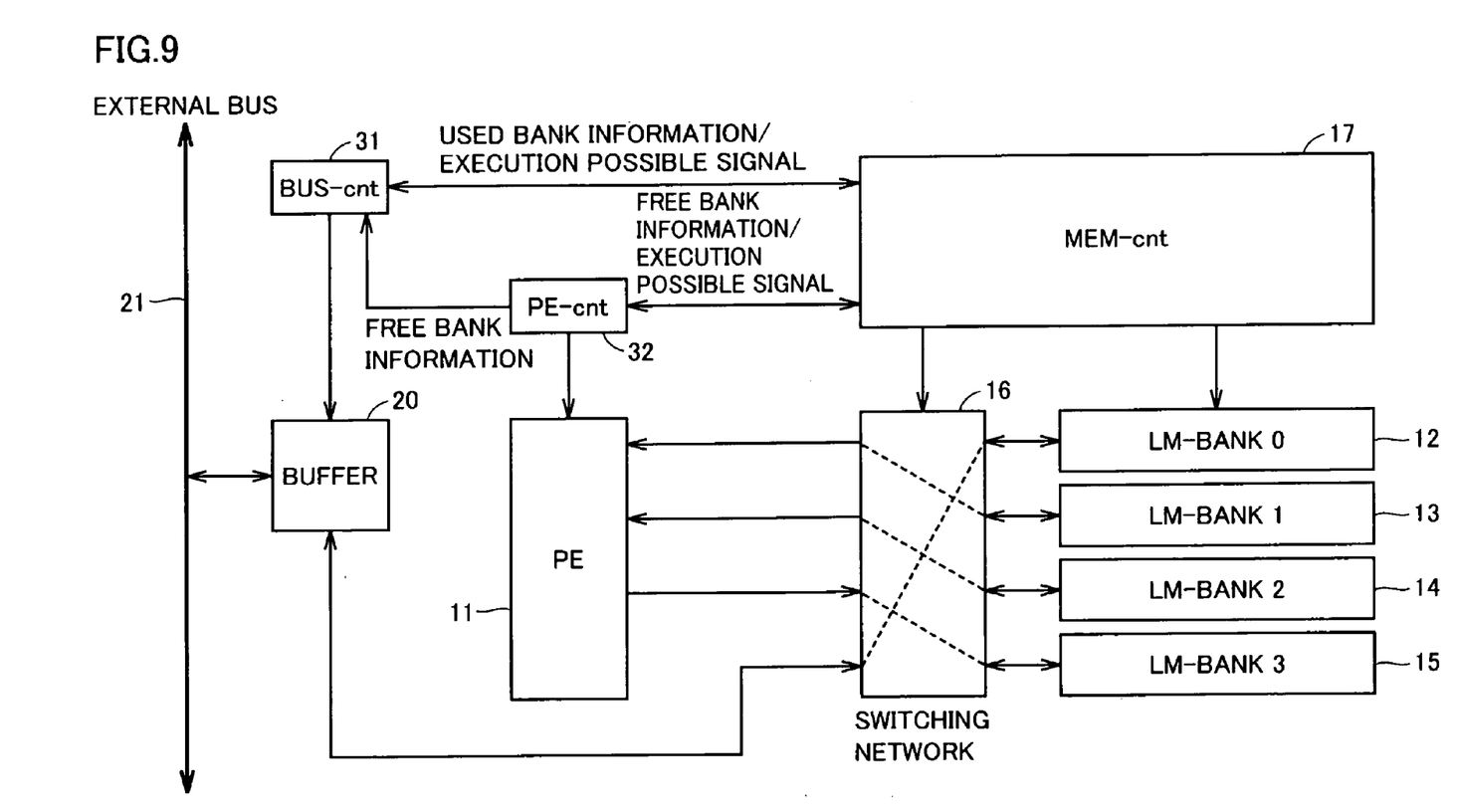
FIG. 9 is a block diagram showing an exemplary configuration of a processor in a fourth embodiment according to the present invention.

FIG. 9 is a block diagram showing an exemplary configuration of a processor in a fourth embodiment according to the present invention. The processor in the present embodiment is different from the processor in the first embodiment shown in FIG. 4, only in that free bank information possessed by a PE controller is inputted also to a bus controller. Accordingly, detailed description of the overlapping configurations and functions will not be repeated.

Figure 10:
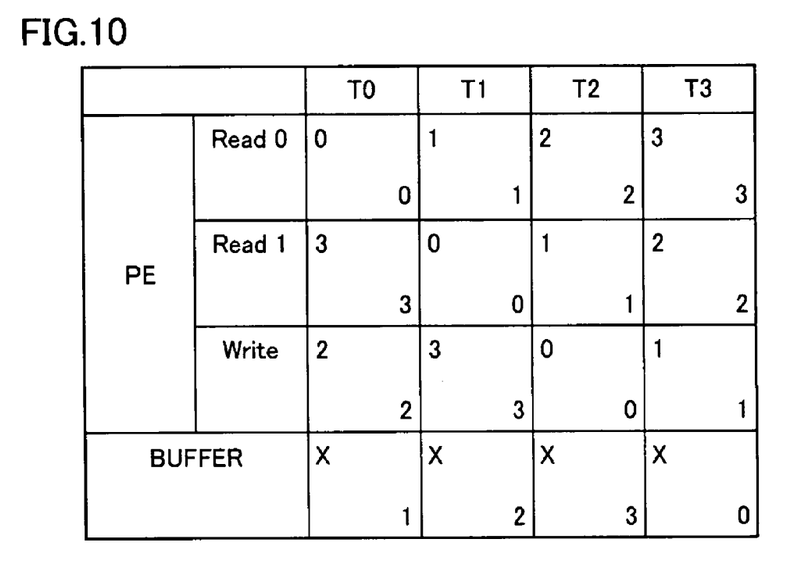
FIG. 10 is a timing chart for explaining one example of processing of the processor in the fourth embodiment according to the present invention.

FIG. 10 is a timing chart for explaining one example of processing of the processor in the fourth embodiment according to the present invention.

At a timing T0, PE 11 requests to use bank 0 and bank 3 as memories for reading, and bank 2 as a memory for writing. At this time, a PE controller 32 outputs "bank 1" as free bank information to memory controller 17 and a bus controller 31.

Also at timing T0, since bus controller 31 receives "bank 1" as free bank information, it outputs "bank 1" as used bank information to memory controller 17.

Since the free bank information received from PE controller 32 coincides with the used bank information received from bus controller 31, memory controller 17 determines that all the requests are executable, and outputs execution possible signals to PE controller 32 and bus controller 31. Then, memory controller 17 controls LM-banks 0 to 3 (12 to 15) and switching network 16 so as to enable all communications.

Also at timings T1 to T3, similarly, memory controller 17 determines that all the requests are executable because the free bank information received from PE controller 32 coincides with the used bank information received from bus controller 31. It then controls LM-banks 0 to 3 (12 to 15) and switching network 16 so as to enable all communications.

As described above, according to the processor in the present embodiment, since bus controller 31 receives free bank information from PE controller 32, and sets the free bank as a used bank, the requests of PE 11 and buffer 20 will not compete with each other. Therefore, it becomes possible to conduct a data transfer with buffer 20 without stopping the operation of PE 11. Accordingly, it is possible to reduce the processing time of the processor.

Fifth Embodiment

An exemplary configuration of a processor in a fifth embodiment according to the present invention is similar to the exemplary configuration of the processor in the fourth embodiment shown in FIG. 9. Accordingly, detailed description of the overlapping configurations and functions will not be repeated.

Figure 11:
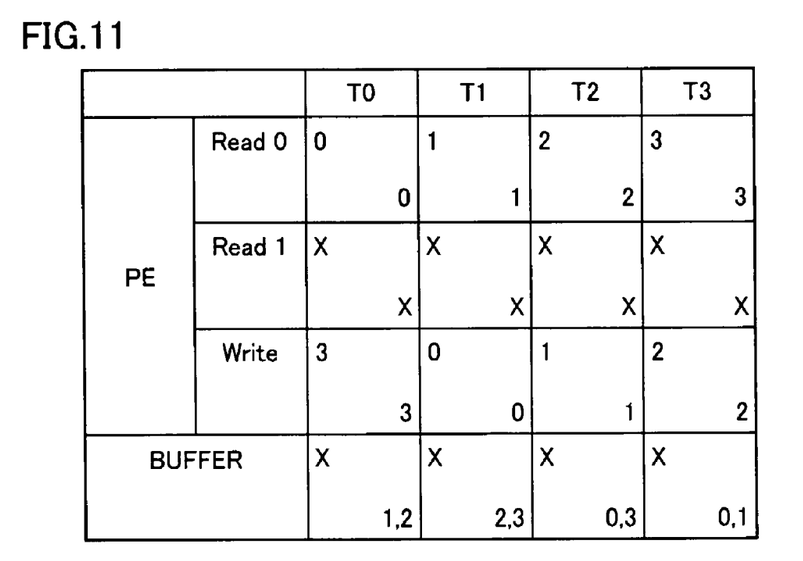
FIG. 11 is a timing chart for explaining one example of processing of a processor in a fifth embodiment according to the present invention.

FIG. 11 is a timing chart for explaining one example of processing of the processor in the fifth embodiment according to the present invention.

At a timing T0, PE 11 requests to use bank 0 as a memory for reading, and bank 3 as a memory for writing. At this time, PE controller 32 outputs "bank 1, bank 2" as free bank information to memory controller 17 and bus controller 31.

Also at timing T0, bus controller 31 receives "bank 1, bank 2" as free bank information, and outputs "bank 1, bank 2" as used bank information to memory controller 17.

Since the free bank information received from PE controller 32 coincides with the used bank information received from bus controller 31, memory controller 17 determines that all the requests are executable, and outputs execution possible signals to PE controller 32 and bus controller 31. Memory controller 17 then controls LM-banks 0 to 3 (12 to 15) and switching network 16 so as to enable all communications.

Also at timings T1 to T3, similarly, memory controller 17 determines that all the requests are executable because the free bank information received from PE controller 32 coincides with the used bank information received from bus controller 31. Memory controller 17 then controls LM-banks 0 to 3 (12 to 15) and switching network 16 so as to enable all communications.

As described above, according to the processor of the present embodiment, when a plurality of banks are free banks, bus controller 31 receives information of the plurality of free banks from PE controller 32, and sets the plurality of free banks as used banks, so that it is possible to achieve a data transfer with buffer 20 at an even higher speed in addition to the effect described in the fourth embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A processor comprising:
    an operation unit having plural processing elements each for operating a plurality of pieces of data in a parallel manner;
    a storing unit separated into a plurality of banks;
    a switching unit switching a path for a data transfer between a device and said plurality of banks, and a path for data reading and data writing between said plurality of banks and said operation unit; and
    a controller controlling the switching by said switching unit based on free bank information representing that a bank among said plurality of banks is free by said operation unit,
    wherein one of said banks is used for read data storing for said operation unit, another of said banks is used for write data storing of said operation unit, and said free bank information identifies in addition to said first and second banks, a free bank of said plurality of banks, wherein said controller generates used bank information, which determines one of said banks to be used for data transfer using said operation unit, wherein said controller enables the data transfer with said outside, and other executable requests including the data reading and data writing by said operation unit, when said free bank information is matched with said used bank information representing that a bank among said plurality of banks is used for the data transfer with said outside, and wherein said controller performs the data transfer with said outside based on a predetermined priority of operations when said free bank information is mismatched with said used bank information.

2. The processor according to claim 1, further comprising a bus controller, and a PE controller, wherein said bus controller issues said used bank information to said controller, and wherein said PE controller issues said free bank information to said controller.

* * * * *